(12) United States Patent
Davis et al.

(10) Patent No.: US 8,067,909 B2
(45) Date of Patent: Nov. 29, 2011

(54) METHOD AND APPARATUS FOR ELECTROMAGNETICALLY BRAKING A MOTOR

(75) Inventors: Donald R. Davis, Brighton, MI (US); Nicolaus A Radford, Houston, TX (US); Frank Noble Permenter, Webster, TX (US); Adam H Parsons, Houston, TX (US); Joshua S Mehling, League City, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 428 days.

(21) Appl. No.: 12/474,430

(22) Filed: May 29, 2009

(65) Prior Publication Data

US 2010/0301785 A1 Dec. 2, 2010

(51) Int. Cl.
 *H02P 7/00* (2006.01)
(52) U.S. Cl. ......................... 318/371; 318/372
(58) Field of Classification Search .................. 318/40, 318/159, 371, 372, 436, 479, 504; 310/77, 310/93, 94; 188/161
See application file for complete search history.

(56) References Cited

U.S. PATENT DOCUMENTS

| | | | |
|---|---|---|---|
| 4,156,478 A | | 5/1979 | Kroeger |
| 5,334,917 A | * | 8/1994 | Lind ..................... 318/400.35 |
| 5,703,456 A | * | 12/1997 | Cox ........................ 318/701 |
| 6,483,217 B1 | | 11/2002 | Roth-Stielow et al. |
| 6,731,034 B1 | | 5/2004 | Habele et al. |
| 7,007,779 B2 | | 3/2006 | Johansson et al. |
| 2006/0001392 A1 | * | 1/2006 | Ajima et al. ................ 318/432 |
| 2006/0103358 A1 | * | 5/2006 | Schulte et al. .............. 320/166 |
| 2008/0272717 A1 | * | 11/2008 | Gleason et al. ............. 318/139 |

* cited by examiner

*Primary Examiner* — Mark Budd
(74) *Attorney, Agent, or Firm* — Quinn Law Group, PLLC

(57) ABSTRACT

An electromagnetic braking system and method is provided for selectively braking a motor using an electromagnetic brake having an electromagnet, a permanent magnet, a rotor assembly, and a brake pad. The brake assembly applies when the electromagnet is de-energized and releases when the electromagnet is energized. When applied the permanent magnet moves the brake pad into frictional engagement with a housing, and when released the electromagnet cancels the flux of the permanent magnet to allow a leaf spring to move the brake pad away from the housing. A controller has a DC/DC converter for converting a main bus voltage to a lower braking voltage based on certain parameters. The converter utilizes pulse-width modulation (PWM) to regulate the braking voltage. A calibrated gap is defined between the brake pad and permanent magnet when the brake assembly is released, and may be dynamically modified via the controller.

18 Claims, 3 Drawing Sheets

METHOD AND APPARATUS FOR ELECTROMAGNETICALLY BRAKING A MOTOR

STATEMENT REGARDING FEDERALLY SPONSORED RESEARCH OR DEVELOPMENT

This invention described herein was made in the performance of work under NASA Space Act Agreement contract number SAA-AT-07-003, and is subject to the provisions of Section 305 of the National Aeronautics and Space Act of 1958, as amended (42 U.S.C. 2457). The federal government may have certain rights in the invention.

TECHNICAL FIELD

The present invention relates to the braking of an electric motor, and in particular to the active control of a power source of an electromagnetic braking system to selectively brake the rotation of a rotor portion of an electric motor.

BACKGROUND OF THE INVENTION

Electric motors are used in a host of robotic or other automated systems to provide a torque suitable for performing useful work in a system. Electric motors include a stator and a rotor, with either or both of these components having windings or coils for producing a magnetic flux when selectively energized by a power supply. The opposing magnetic fluxes of the stator and rotor ultimately produce the desired rotation of the rotor. The rotational force may be harnessed as needed to produce the desired torque within the driven system.

Electric motors come in a variety of alternating current (AC) and direct current (DC) designs. DC motors in particular may be of the brush type, the brushless type, or the stepper motor type, with each design having relative performance advantages. Of these, the brushless DC or BLDC motor eliminates windings from the rotor and thereby provides certain efficiency, durability, and noise-related performance advantages relative to other motor designs.

In a fail-safe electromagnetic braking system of the type commonly used with a BLDC motor, electrical power may be selectively applied to an electromagnet to actuate or release the brake depending on the design of the brake assembly. For example, one design applies a voltage to the coils of an electromagnet portion of the brake assembly, with the electromagnetic flux generated by the electromagnet ultimately cancelling a magnetic flux of a permanent magnet portion of the brake assembly. Once the respective fluxes are cancelled in this manner a brake pad disengages from frictional engagement with the rotor. Likewise, interruption of power transmission to the electromagnet allows the magnetic flux of the permanent magnet to move the brake pad into frictional engagement with the rotor, thereby applying the brake.

In conventional electromagnetic braking systems the main DC power supply providing electrical power to the motor is usually separate from the power supply used to energize the brake assembly. This is due in large part to the substantial difference between the motor voltage and the required brake release voltage. To optimize performance of a given electromagnetic brake assembly, a controller may apply a constant biasing force using DC power provided by the dedicated brake power supply. However, this practice may result in the generation of excessive heat in the brake assembly, a result that may affect certain heat-sensitive components positioned in proximity to any of the heated surfaces.

SUMMARY OF THE INVENTION

Accordingly, an electromagnetic brake assembly is provided for use with a BLDC motor as described above. The brake assembly has a low-power braking state that greatly reduces the amount of heat generated therein. Within the scope of the invention, a controller executes an algorithm to control the brake voltage when the brake assembly is released, and when it is subsequently held in the released state. To do so, the controller utilizes a DC/DC buck converter having a pulse width modulating (PWM) circuit adapted for reducing a main bus voltage to a voltage level that is more suitable for control of the brake assembly. That is, the controller generates a suitable PWM voltage level ($V_{PWM}$) using the PWM circuit and automatically adjusts the voltage level delivered to the brake assembly as needed based on a set of brake control parameters.

The brake control parameters may include values directly or indirectly describing the temperature of the brake assembly, a voltage or current applied to the brake assembly, motor speed, motor torque, etc., with other environmental and/or dynamic parameters also or alternately usable within the intended scope of the invention. The PWM circuit of the controller may optionally include a set of jumpers that allow the brake assembly to be manually released as needed, such as during maintenance of the motor or of the brake assembly.

A calibrated gap is defined by and between the brake pad and electromagnet of the brake assembly. The gap size may be sized as needed depending on the particular design of the brake assembly. In one embodiment, the gap size may be dynamically modified and optimized using an actuator. The optimized gap enabled by the present invention may decrease the magnetic effect of the permanent magnet and/or may increase the pull force of a spring, thereby requiring a lower relative level of power transmission to the electromagnet for cancelling the magnetic flux of the permanent magnet. The brake control parameters may be relayed to the controller as continuous feedback values to allow the controller to actively tune the required voltage and/or current supplied to the brake assembly, ultimately increasing the overall efficiency of the brake assembly.

In particular, a motor assembly is provided herein that includes a rotor assembly, a stator having windings that are selectively energized by a first voltage from a high voltage bus to cause rotation of the rotor assembly, a brake assembly, and a controller. The brake assembly has an electromagnet, a permanent magnet, and a brake pad, and is adapted for releasing the rotor when the electromagnet is energized using a second voltage, and for braking the rotor when the electromagnet is de-energized. The controller includes a DC-DC converter adapted for converting the first voltage to a second voltage that is lower than the first voltage, and an algorithm adapted for optimizing the second voltage as a function of brake control parameters.

A method is also provided herein for optimizing the efficiency of an electromagnetic brake assembly having a housing containing an electromagnet and a permanent magnet, and having a moveable brake pad adapted for selectively braking a rotor of a motor assembly. The method includes detecting the set of brake control parameters, using a DC-DC converter to convert a first voltage from a high-voltage bus to a second voltage that is lower than the first voltage, and applying the second voltage to an electromagnet of the electromagnetic brake assembly to substantially cancel a magnetic flux of the permanent magnet. Flux cancellation allows the brake pad to move out of frictional engagement with a surface of the housing to allow rotation of the rotor. Absent flux cancellation, the rotor is braked via frictional engagement of the brake pad with the housing. The method includes varying the second voltage as a function of the set of brake control parameters to thereby determine an optimal value of the second voltage.

The above features and advantages and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
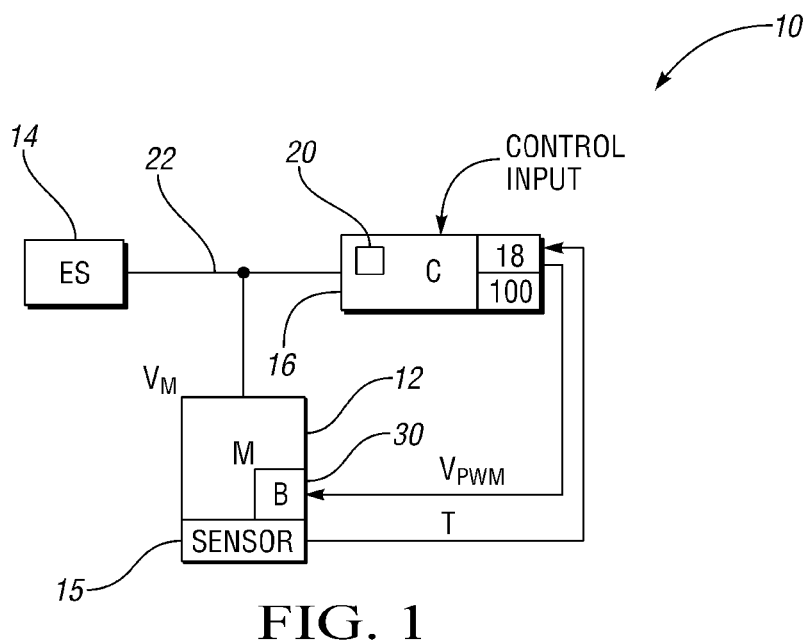
FIG. 1 is a schematic illustration of a motor control circuit having an electric motor and an electromagnetic brake assembly that is controllable in accordance with the method of the invention.

Referring to the drawings wherein like reference numbers refer to like components throughout the several views, and beginning with FIG. 1, a motor control circuit 10 includes an electric motor assembly (M) 12. The motor assembly 12 receives electrical power via a main bus voltage ($V_M$) from an energy supply (ES) 14 via a high-voltage bus 22. The motor assembly 12 also receives a brake voltage ($V_{PWM}$) from a DC/DC converter 18 resident in or accessible by a controller (C) 16 for continuous voltage control of an electromagnetic brake assembly (B) 30 as set forth in detail below.

The motor assembly 12 and the controller 16 may be configured to provide desired levels of motion control of a motorized robot, machine, or any other motor-driven device. The controller 16 receives a set of control inputs, for example from a central robot processor, a user interface, a host machine, etc., and processes the control input as set forth below using a central processing unit (CPU) or processor 20. A brake control algorithm 100 described below with reference to FIG. 4 may be executed by the controller 16 using the processor 20 to thereby control the braking action of the motor assembly 12.

Still referring to FIG. 1, the controller 16 may be configured as a computer-based control device having a microprocessor or a central processing unit (CPU). i.e., the processor 20 noted above, various electronic and/or magnetic memory locations or areas, one or more network connectors, and input/output (I/O) sections for receiving and transmitting the various I/O control signals being fed to the controller 16 by a process being controlled. The controller 16 may include appropriate control circuitry for executing predetermined motion control sequences in response to one or more input control variables in order to produce a desired control response. The controller 16 may be used in this manner to automatically check the status of various control inputs, usually by reading values determined by any required dynamic or environmental sensors, to execute a function, to update the output status, and then to repeat the cycle as needed.

The brake assembly 30 is electromagnetic in design, as explained above, and may be electrically connected to the energy supply 14 and the high-voltage bus 22 through the controller 16. Using the converter 18 and a predetermined set of brake control parameters, including a temperature signal (T) detected using one or more sensors 15 and ultimately describing a temperature of the brake assembly 30 and, if desired, the motor portion of the motor assembly 12, the controller 16 provides the brake assembly 30 with a pulse-width modulated (PWM) brake voltage ($V_{PWM}$) as described below. In one embodiment the brake assembly 30 may be released when it is energized and engaged when it is de-energized to thereby provide a fail-safe electromagnetic braking design.

Figure 2:
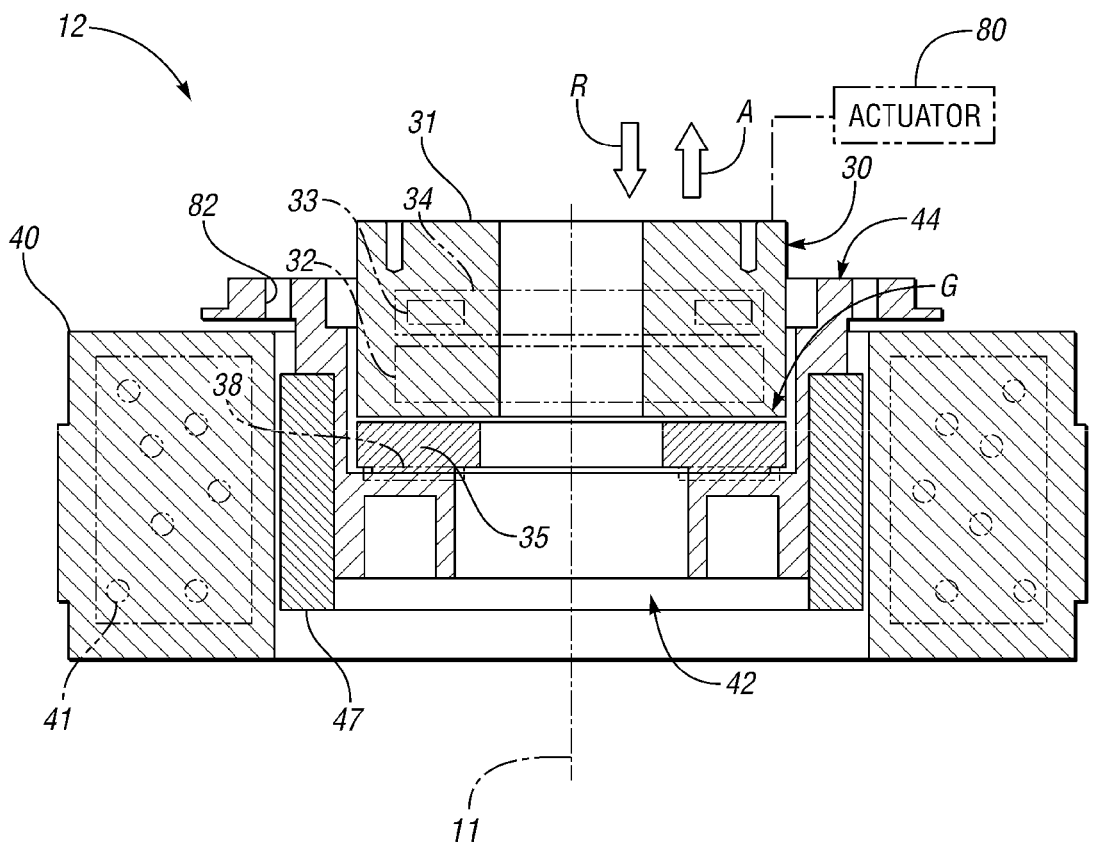
FIG. 2 is a schematic partial cross-sectional view of the motor and brake of FIG. 1.

Referring to FIG. 2, the motor assembly 12 according to one embodiment includes a stator assembly 40, a rotor assembly 42, and the brake assembly 30. The stator assembly 40 includes a set of stator windings 41. As will be understood by those of ordinary skill in the art, when the stator windings 41 are energized by the energy supply 14 shown in FIG. 1 or by another suitable source of energy, an electromagnetic flux is generated with respect to the windings 41. The rotor assembly 42 includes a steel hub with magnets 47 attached thereto. The magnetic flux of the rotor magnets 47 opposes the electromagnetic flux of the stator assembly 40, thereby causing the rotor assembly 42 to rotate with respect to axis 11.

The brake assembly 30 includes a permanent magnet 32 and an electromagnet 34 with a set of coils 33. The permanent magnet 32 and the electromagnet 34 are housed within a housing 31. The rotor assembly 42 may include a hub 44. The hub 44 may include mounting holes 82 suitable for attaching the rotor assembly 42 to a driven member (not shown), e.g., a robotic linkage or other motor-driven component. According to one embodiment the hub 44 may be formed of aluminum or another lightweight and nonmagnetic material, although other materials or designs are also usable without departing from the intended scope of the invention.

The brake assembly 30 also includes a brake pad 35 or other suitable friction member, which may be constructed of ferrous or other magnetizable materials. The brake pad 35 may be formed of a unitary or solid/single piece of magnetic material in one embodiment, although multi-piece designs may also be used. The brake pad 35 is connected to the hub 44 using a resilient member, e.g., a set of leaf springs 38, which move the brake pad 35 in the direction of arrow R (i.e., for "release") to hold the brake pad 35 flush against the hub 44 whenever the brake assembly 30 is in a released or a disengaged state. The brake pad 35 freely rotates with the hub 44 and the rest of the rotor assembly 42 when the brake assembly 30 is released or disengaged.

In other words, the magnetic flux of the electromagnet 34 may be selectively induced or generated to cancel the magnetic flux of the permanent magnet 32, thereby allowing the leaf springs 38 to release the brake pad 35 and hold the brake assembly 30 in a released state. Likewise, the brake assembly 30 may be applied by selectively de-energizing its coils 33. When the coils 33 are de-energized, the flux of the permanent magnet 32 overcomes the return force of the leaf springs 38 and attracts the magnetic brake pad 35 in the direction of arrow A (i.e., for "apply"). In this manner, the brake assembly 30 is applied using direct frictional contact between the brake pad 35 and the housing 31.

Referring again to FIG. 1, the power supplied to the brake assembly 30 may be controlled via the controller 16 to provide a low-power state without the addition of a dedicated braking power supply. For example, a voltage of approximately 24V may be needed to initially release the brake assembly 30. A lower voltage of approximately 14V-17V thereafter may be used to hold the released state. The controller 16 may receive a transmitted set of brake control parameters, such as but not necessarily limited to a brake current, time, and brake and/or motor temperature. The controller 16 may then optimize the voltage level of the brake assembly 30 during the release and subsequent release holding states using the values of the brake control parameters.

As will be understood by those of ordinary skill in the art, temperature affects the performance and efficiency of the brake assembly 30. Brake temperature may be determined using the sensors 15, e.g., via proportional voltage sensing, variable resistance, calculation, etc., and voltage and/or current transmitted to the brake assembly 30 may be controlled to ameliorate any adverse temperature-related effects. That is, the efficiency of the brake assembly 30 may be greatly improved by controlling the holding voltage during release of the brake assembly, which in turn may reduce the heat introduced into the surrounding system. Controlling the brake assembly 30 using a stepped-down or modulated portion of the main bus voltage ($V_M$) from the HV bus 22 of FIG. 1, which is already allocated for delivery of the required motor power, thus eliminates the need for independent brake power to be routed throughout the system, e.g., to a robot or other motor-driven system.

The HV bus 22 is connected to the energy supply 14 and powers the motor assembly 12. To power the brake assembly 30, the main bus voltage ($V_M$) conducted via the HV bus 22 may be stepped down via the converter 18 to provide a suitable pulse width modulated (PWM) voltage ($V_{PWM}$). That is, the controller 16 uses the algorithm 100 and the converter 18 as described below to selectively reduce the main bus voltage ($V_M$) to a voltage level that is more suitable for control of the brake assembly 30, particularly when the brake assembly is holding a released state. In one embodiment, the voltage level for holding the released state is approximately 70% or less of the voltage used for releasing the brake assembly 30, although other values may be used without departing from the intended scope of the invention. The controller 16 dynamically adapts the value of the voltage ($V_{PWM}$) using the values of the brake control parameters to optimize performance of the brake assembly 30.

Referring again to FIG. 2, a brake gap (arrow G) is defined by or provided between the brake pad 35 and the permanent magnet 32. The gap has a calibrated size. In one embodiment, an actuator 80 may be selectively controlled via the controller 16 of FIG. 1 to vary the size of the gap (arrow G). For example, the actuator 80 may be configured to move the housing 31 along axis 11 as shown in the embodiment of FIG. 2. Alternately, the actuator 80 may be configured to move the brake pad 35 and/or the rotor assembly 42, or any suitable portions thereof, to achieve the same gap sizing effect, thereby optimizing the size of the gap (arrow G) in response to the brake control parameters. For example, the gap size may be increased when the motor assembly 12 is in a standby or low-power state, such as when the brake assembly 30 is applied, and decreased when the motor assembly is in an active state. Actuator 80 may be embodied as an electromechanical, hydraulic, pneumatic, piezoelectric, shape memory alloy (SMA), or other suitable actuator device capable of moving the housing 31 or the permanent magnet 32, with respect to the brake pad 35.

Figure 3:
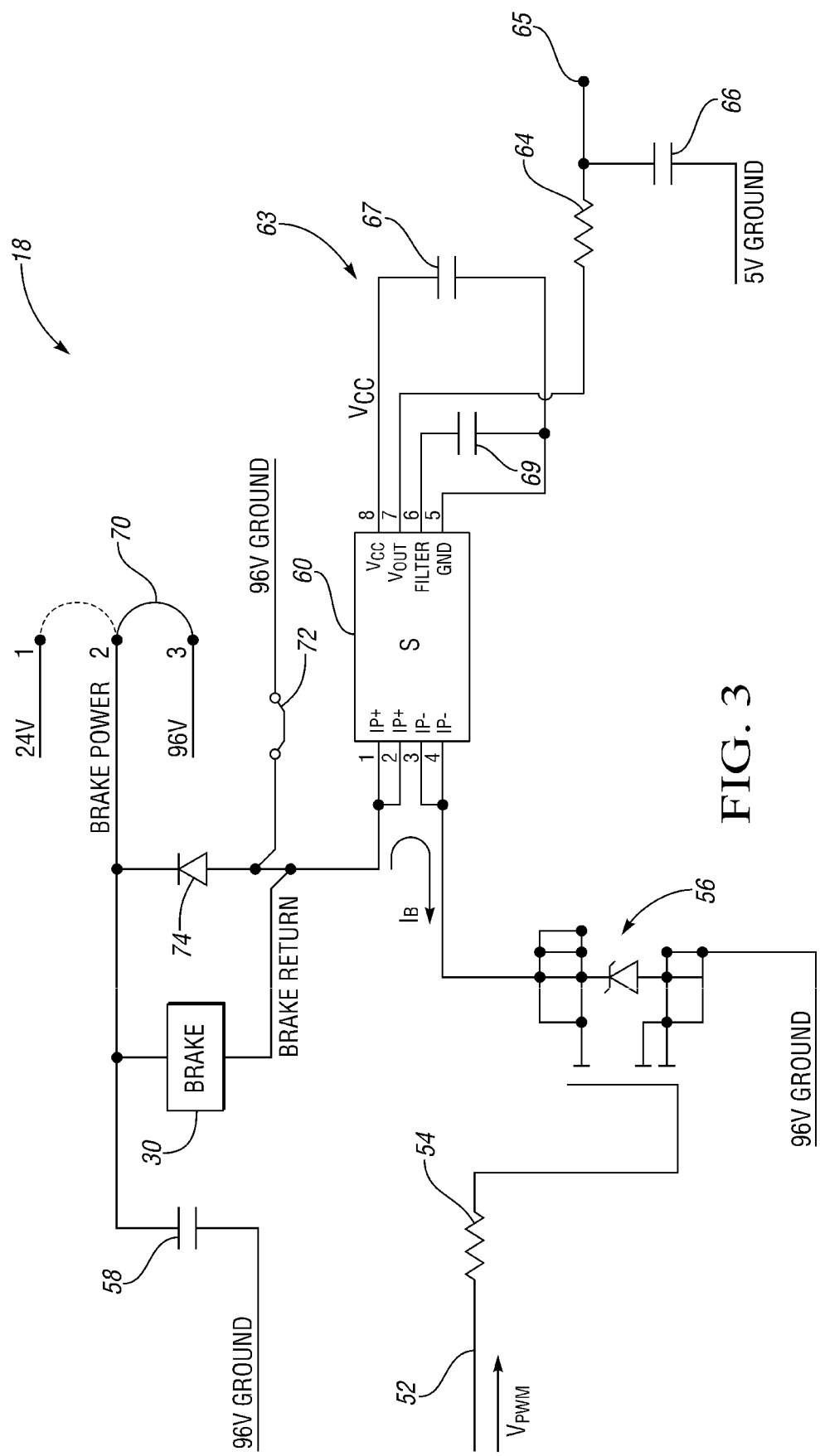
FIG. 3 is a schematic circuit diagram describing a pulse-width modulating (PWM) circuit usable with the controller of the circuit shown in FIG. 1.

Referring to FIG. 3, the converter 18 of controller 16 (also see FIG. 1) is operable for stepping down the main bus voltage ($V_M$) using the process of pulse width modulation (PWM), and for applying the resultant voltage (arrow $V_{PWM}$) to the low-side of the brake assembly 30. The term "high-side" as used herein refers to the "BRAKE POWER" line in FIG. 3, which is ordinarily at the 96V level in the embodiment of FIG. 3 unless 24V power is applied by positioning of jumper 70 as described below. The term "low-side" refers to the "BRAKE RETURN" line in FIG. 3, which may be disconnected or connected to 96V Ground as explained below.

Two bus voltages may be provided: 24V for operation of the various required processors, sensors, etc., and the main bus voltage ($V_M$) of 96V for powering the motor portion of the motor assembly 12 shown in FIG. 1. The 24V bus may be referred to as "logic power", and is itself regulated to different voltage levels based on the requirements of the various logic chips, e.g., approximately 3V to approximately 4V in the case of a field programmable gate array (FPGA) used as or with the processor 20 of controller 16 (see FIG. 1). The voltage signal (arrow $V_{PWM}$) is transmitted to a field effect transistor (FET) 56 via a signal line 52 from the controller 16 (see FIG. 1) through a suitable resistor 54.

Modulation of the voltage signal (arrow $V_{PWM}$) ultimately turns the FET 56 on and off. When the FET 56 is turned off, the low-side of the brake assembly 30 is disconnected, and power transmission to the brake assembly 30 is terminated. When the FET 56 is turned on, the low side of the brake assembly 30 is connected to 96V Ground, i.e., the brake assembly 30 is directly connected to the HV bus 22 (see FIG. 1), which is at a maximum of approximately 96V according to this particular embodiment. The controller 16 thereafter applies PWM to modify the duty cycle of the voltage signal ($V_{PWM}$) as needed to thereby optimize the voltage level transmitted to the brake assembly 30.

In particular, the controller 16 selectively tunes the 96V of the HV bus 22 to a lower voltage that remains suitable for allowing the brake assembly 30 to disengage. Initially, a voltage of approximately 24V may be sufficient for releasing the brake assembly 30, i.e., a duty cycle of 24/96=0.25. After the brake assembly 30 is released, the controller 16 may use the brake control parameters to lower the voltage level even further, e.g., approximately 14V to approximately 17 V or lower in one embodiment, using a corresponding duty cycle of 17/96=0.177, although the actual value may vary depending on the size of the gap (arrow G) of FIG. 2 as well as the values of the brake control parameters. When using the actuator 80 of FIG. 2, the gap (arrow G) shown in that Figure may be selectively varied based on the values of the brake control parameters as set forth above.

Still referring to FIG. 3, the brake assembly 30 may be electrically connected with a decoupling capacitor 58 that filters out or decouples noise. A sensor 60 may be adapted relaying an output voltage ($V_{OUT}$) based on the brake current (arrow $I_B$), whether using proportional voltage sensing or another suitable current sensing device, which may be read using an analog-to-digital chip (not shown) or other device at an electrical lead 65. The sensor 60 has a power supply 63. As shown in the embodiment of FIG. 3, the power supply 63 may include capacitors 67 and 69, with capacitor 67 acting as decoupling capacitor and capacitor 69 setting the bandwidth of sensor 60. A suitable resistor 64 and capacitor 66 may also be used to ultimately provide a filtered voltage value ($V_{OUT}$) that may be read at the electrical lead 65.

Optionally, a set of jumpers 70, 72 may be used to manually release the brake assembly 30 as needed, for example during maintenance of any portion of the motor assembly 12 of FIGS. 1 and 2, or during maintenance of anything connected to the output of the motor assembly. That is, jumper 70 may remain in place at positions 2-3 during normal operation, and may be moved to location 1-2 for manual brake release, while jumper 72 remains positioned as shown in FIG. 3 only during such manual brake release. 24V logic power may be used to release the brake assembly 30 if the controller 16 is not communicating or is otherwise down, e.g., during maintenance. Added circuit protection may be provided using a fly-back diode 74 or other suitable device as shown in FIG. 3.

Figure 4:
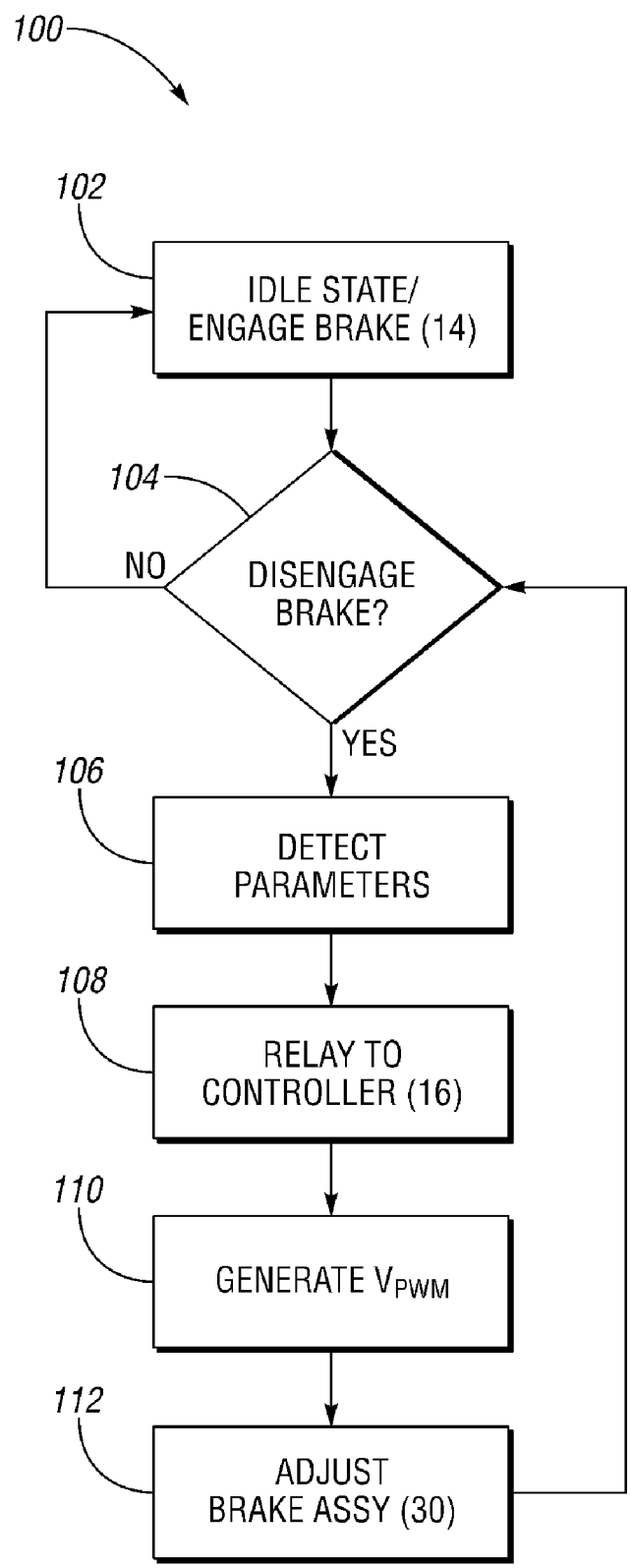
FIG. 4 is a flow chart describing a control algorithm usable with the controller of the circuit shown in FIG. 1.

Referring to FIG. 4, and beginning with step 102, the brake assembly 30 of FIGS. 1 and 2 may be initially placed in an idle or engaged state. The algorithm 100 then proceeds to step 104.

At step 104 the algorithm 100 determines whether the brake assembly 30 has received a command to disengage. Such a command may be provided by the controller 16 in response to a separate control algorithm (not shown) used to control the motor assembly 12 of FIG. 1. Should such a command be detected the algorithm 100 proceeds to step 106, otherwise repeating step 102.

At step 106 the algorithm 100 detects, measures, or otherwise determines values for a calibrated set of brake control parameters. For example, step 106 may entail using the sensor(s) 15 of FIG. 1 to determine the temperature (T) of the brake assembly 30 and/or another portion of the motor assembly 12. Sensor 60 of FIG. 3 may be used to determine brake current. The brake control parameters may also or alternately include any other useful values, including but not limited to brake voltage, motor speed, motor torque, etc. Step 106 therefore encompasses the measurement of each of the values used for the brake control parameters. At step 106 the controller 16 may also process other known values describing the status of a particular joint of a robot using the motor assembly 12, if so configured, for example using speed and torque measurements. The algorithm 100 then proceeds to step 108.

At step 108 the values of the various brake control parameters determined at step 106 are transmitted to and received by the controller 16 and temporarily stored in memory therein. The algorithm 100 then proceeds to step 110.

At step 110, the controller 16 processes the values from step 108 and generate a suitable PWM signal (arrow $V_{PWM}$ of FIG. 3) in response to the brake control parameters. The brake assembly 30 may be controlled using the PWM signal ($V_{PWM}$) from step 108. At step 110 the FET 56 of FIG. 3 is driven between on and off states at a predetermined duty cycle on the low side of the brake assembly 30, with the duty cycle ultimately determining the voltage level delivered to the brake assembly 30, and particularly during its released state. The algorithm 100 then proceeds to step 112.

At step 112, the algorithm 100 adjusts the brake assembly 30 as needed based on the changing environment, i.e., changes to the brake control parameters including any parameters ultimately describing the temperature (T), brake current ($I_B$), brake voltage, motor speed, motor torque, etc. Step 112 may include the automatic adjustment of the gap (arrow G) of FIG. 2 using the actuator 80 if so configured, with the controller 16 adjusting the gap size based on the values of the brake control parameters. After adjusting the brake assembly 30 as needed, the algorithm 100 returns to step 104 and repeats steps 104-112 in a continuous loop.

Algorithm 100 automatically continues in a closed loop unless it is forced to terminate, e.g., if logic power is removed at any time. Should this occur, all processors, chips, sensors will automatically shutdown, and the algorithm 100 would be unable to continue, causing the brake to engage.

While the best modes for carrying out the present invention have been described in detail, those familiar with the art to which this invention relates will recognize various alternative designs and embodiments for practicing the invention within the scope of the appended claims.

The invention claimed is:

1. A motor assembly comprising:
   a rotor;
   a stator having windings that are selectively energized by a first voltage from a high voltage bus to cause rotation of the rotor assembly;
   a brake assembly having an electromagnet, a permanent magnet, and a moveable brake pad, wherein the brake assembly is adapted for releasing the rotor when the electromagnet is energized using a second voltage, and for braking the rotor when the electromagnet is de-energized; and
   a controller having a DC-DC converter for converting the first voltage to the second voltage, the second voltage being lower than the first voltage;
   wherein the controller includes an algorithm adapted for optimizing the second voltage as a function of a set of brake control parameters.

2. The motor assembly of claim 1, wherein the brake control parameters include at least one of: brake current, brake voltage, brake temperature, motor speed, and motor torque.

3. The motor assembly of claim 1, wherein the controller applies pulse-width modulation (PWM) to vary the duty cycle of the first voltage, and to thereby generate the second voltage.

4. The motor assembly of claim 1, wherein the brake pad defines a gap of a calibrated size in conjunction with the permanent magnet when the brake assembly is in a released state, and wherein the brake control parameters include the calibrated size of the gap.

5. The motor assembly of claim 4, further comprising: an actuator in communication with the controller and adapted for selectively modifying the calibrated size of the gap using the brake control parameters.

6. The motor assembly of claim 1, further comprising a set of springs, wherein the springs are positioned between and directly connected to the brake pad and to a surface of the rotor.

7. The motor assembly of claim 1, further comprising a first sensor configured for generating an output signal that varies in response to the temperature of the brake assembly, and a second sensor for determining the brake current, wherein the brake control parameters includes the respective output signals of the first and second sensors.

8. An electromagnetic brake assembly for use with a motor assembly having a rotor and a stator operable for causing rotation of the rotor when the stator is energized, the electromagnetic brake assembly comprising:
   an electromagnet;
   a permanent magnet;
   a moveable brake pad, wherein the electromagnetic brake assembly is adapted for releasing the brake pad from frictional engagement with the rotor when the electromagnet is energized using a second voltage, and for braking the rotor via friction engagement with the rotor when the electromagnet is de-energized; and
   a controller having a DC-DC converter operable for converting the first voltage to the second voltage at a voltage level lower than that of the first voltage;
   wherein the controller includes an algorithm adapted for optimizing the second voltage as a function of a set of brake control parameters.

9. The brake assembly of claim 8, wherein the controller applies pulse-width modulation (PWM) to vary a duty cycle of the first voltage, thereby generating the second voltage.

10. The brake assembly of claim 8, wherein the brake pad defines a gap of a calibrated size in conjunction with the permanent magnet, and wherein the brake control parameters includes the calibrated size.

11. The brake assembly of claim 10, wherein the brake control parameters further include at least one of: brake current, brake voltage, brake temperature, motor speed, and motor torque.

12. The brake assembly of claim 11, further comprising: an actuator in communication with the controller and adapted for selectively changing the calibrated size of the gap based on the brake control parameters.

13. The brake assembly of claim 8, wherein the brake pad is formed of a unitary piece of magnetic material.

14. The brake assembly of claim 13, further comprising a housing containing the electromagnet and the permanent magnet, wherein the brake pad frictionally engages the housing when the electromagnet is de-energized.

15. A method for optimizing the efficiency of an electromagnetic brake assembly having a moveable brake pad adapted for selectively braking a rotor of a motor assembly, and having a housing containing an electromagnet and a permanent magnet, the method comprising:

detecting a set of brake control parameters;

using a DC-DC converter to convert a first voltage from a high-voltage bus to a second voltage that is lower than the first voltage;

applying the second voltage to the electromagnet to substantially cancel a magnetic flux of the permanent magnet, and to thereby allow the brake pad to move out of frictional engagement with the housing to release the rotor;

discontinuing the second voltage to thereby allow the permanent magnet to move the brake pad into frictional engagement with the housing to brake the rotor; and automatically varying the second voltage as a function of a set of brake control parameters to thereby determine an optimal value of the second voltage.

16. The method of claim 15, wherein the permanent magnet and the brake pad define a gap of a calibrated size therebetween, the method further comprising:

using an actuator to selectively adjust the size of the size of the gap.

17. The method of claim 16, wherein using an actuator to selectively adjust the size of the gap includes activating an actuator to thereby move a component of the motor assembly in an axial direction with respect to an axis of rotation of the rotor.

18. The method of claim 15, wherein continuously optimizing the second voltage includes varying a duty cycle using pulse width modulation (PWM), and applying the duty cycle to the first voltage to thereby generate the second voltage.

* * * * *